US009483685B2

United States Patent
Chennubhotla et al.

(10) Patent No.: US 9,483,685 B2
(45) Date of Patent: Nov. 1, 2016

(54) SYSTEM AND METHOD FOR AUTOMATED IDENTIFICATION OF ABNORMAL CILIARY MOTION

(71) Applicant: UNIVERSITY OF PITTSBURGH—OF THE COMMONWEALTH SYSTEM OF HIGHER EDUCATION, Pittsburgh, PA (US)

(72) Inventors: Chakra S. Chennubhotla, Pittsburgh, PA (US); Shannon P. Quinn, Pittsburgh, PA (US); John R. Durkin, Quakertown, PA (US); Maliha Zahid, Gibsonia, PA (US); Richard John Bruce Francis, Pittsburgh, PA (US); Cecilia Wen Ya Lo, Pittsburgh, PA (US)

(73) Assignee: University of Pittsburgh - Of the Commonwealth System of Higher Education, Pittsburgh, PA (US)

( * ) Notice: Subject to any disclaimer, the term of this patent is extended or adjusted under 35 U.S.C. 154(b) by 7 days.

(21) Appl. No.: 14/697,742

(22) Filed: Apr. 28, 2015

(65) Prior Publication Data
US 2015/0310254 A1 Oct. 29, 2015

Related U.S. Application Data

(60) Provisional application No. 61/984,943, filed on Apr. 28, 2014.

(51) Int. Cl.
*G06K 9/68* (2006.01)
*G06K 9/00* (2006.01)
*G06T 7/00* (2006.01)
(Continued)

(52) U.S. Cl.
CPC ....... *G06K 9/00147* (2013.01); *G06K 9/00335* (2013.01); *G06K 9/522* (2013.01); *G06K 9/6212* (2013.01); *G06K 9/6269* (2013.01); *G06T 7/0016* (2013.01); *G06T 7/206* (2013.01); *G06T 7/2066* (2013.01); *G06T 2207/10056* (2013.01); *G06T 2207/20076* (2013.01); *G06T 2207/20081* (2013.01); *G06T 2207/30024* (2013.01)

(58) Field of Classification Search
CPC ............. G06K 9/00335; G06K 9/522; G06K 9/6269; G06K 9/00147; G06K 9/6212; G06T 7/2066; G06T 2207/10056; G06T 2207/30024; G06T 2207/20081; G06T 7/0016; G06T 7/206; G06T 2207/20076
USPC ....................................................... 382/218
See application file for complete search history.

(56) References Cited

PUBLICATIONS

O'Callaghan C., et al., Diagnosing primary ciliary dyskinesia. Thorax 62: 656-657 (2007).*
(Continued)

*Primary Examiner* — Gregory F Cunningham
(74) *Attorney, Agent, or Firm* — Eckert Seamans Cherin & Mellott, LLC; Philip E. Levy (57) ABSTRACT

A method of classifying ciliary motion includes receiving digital video data representing the ciliary motion generated by an image capture device, wherein the digital video data includes a plurality of frames. The method further includes receiving an indication of a region of interest applicable to each of the frames, wherein the region of interest includes a plurality of pixels in each of the frames, calculating time series elemental motion data for at least one elemental motion parameter for the region of interest based on the digital video data, and using the time series elemental motion data to classify the ciliary motion.

20 Claims, 6 Drawing Sheets

(51) Int. Cl.
 *G06T 7/20* (2006.01)
 *G06K 9/62* (2006.01)
 *G06K 9/52* (2006.01)

(56) References Cited

PUBLICATIONS

Dimova, S., et al., High-speed digital imaging method for ciliary beat frequency measurement. Journal of pharmacy and pharmacology 57: 521-526 (2005).*

O'Callaghan C., et al., Analysis of ependymal ciliary beat pattern and beat frequency using high speed imaging: comparison with the photomultiplier and photodiode methods. Cilia 1:8 (2012).*

Mantovani G., et al., Automated software for analysis of ciliary beat frequency and metachronal wave orientation in primary ciliary dyskinesia. European Archives of Oto-Rhino-Laryngology 267: 897-902 (2010).*

Sisson J., et al., All-digital image capture and whole-field analysis of ciliary beat frequency. Journal of microscopy 211: 103-111 (2003).

Quinn S., et al., Novel use of differential image velocity invariants to categorize ciliary motion defects. In: Biomedical Sciences and Engineering Conference (BSEC) IEEE, pp. 1-4 (2011).

* cited by examiner

FIG. 6

SYSTEM AND METHOD FOR AUTOMATED IDENTIFICATION OF ABNORMAL CILIARY MOTION

CROSS-REFERENCE TO RELATED APPLICATIONS

This application claims priority under 35 U.S.C. § 119(e) from U.S. provisional patent application No. 61/984,943, entitled "System and Method for Automated Diagnosis of Abnormal Ciliary Motion" and filed on Apr. 28, 2014, the contents of which are incorporated herein by reference.

GOVERNMENT CONTRACT

This invention was made with government support under grant #HL908180 awarded by the National Institutes of Health (NIH). The government has certain rights in the invention.

BACKGROUND OF THE INVENTION

1. Field of the Invention

The present invention pertains to the diagnosis of defects in ciliary motion that can lead to sinopulmonary disease, and in particular, to systems and methods for automatically classifying ciliary motion as normal or abnormal using video images of the ciliary motion and decomposing the ciliary motion into constituent motion elements, such as, without limitation, rotation and deformation.

2. Description of the Related Art

Cilia are microtubule-based hair-like projections of the cell that can be motile or immotile, and in humans are found on nearly every cell of the body. Diseases known as ciliopathies with disruption of nonmotile or motile cilia function can result in a wide spectrum of diseases. In primary ciliary dyskinesia (PCD), cilia in the airway that normally beat in synchrony to mediate mucus clearance can exhibit dyskinetic motion or become immotile, resulting in severe sinopulmonary disease. As motile cilia are also required for left-right patterning, PCD patients can exhibit mirror symmetric organ placement, such as in Kartagener's syndrome, or randomized left-right organ placement, such as in heterotaxy. Patients with congenital heart disease (CHD) and heterotaxy exhibit a high prevalence of ciliate motion (CM) defects similar to those seen with PCD. CM defects have also been associated with increased respiratory complications and poor postsurgical outcomes. Similar findings were observed in patients with a variety of other CHD, including transposition of the great arteries (TGA). Diagnosing patients with CM abnormalities early may provide the clinician with opportunities to institute prophylactic respiratory therapies to prevent the need for surgical treatments.

Current methods for assessing CM rely on a combination of tools comprising a "diagnostic ensemble." One of these tools entails the use of video microscopy for CM analysis of nasal brush biopsies. Ciliary beat frequency (CBF) can be computed from these videos, but it has low sensitivity for abnormal CM. Furthermore, CBF does not capture the broad distribution of frequencies present in ciliary biopsies. Clinicians often employ visual assessment of ciliary beat pattern to augment CBF measurements. However, this relies on reviewer experience and is therefore highly subjective and error-prone. Electron microscopy (EM), considered one of the most reliable methods of the ensemble, cannot identify PCD patients who present without ultra-structural defects. Finally, it is difficult to compare results of the diagnostic ensemble in cross-institutional studies. Quantifying CM requires an objective, sensitive, and verifiable method. Computational methods, for example, can be trained to detect different types of motion and small changes in beat frequencies for identifying CM defects, and either present them in a quantitative format, or classify the motion phenotypes with greater precision and objectivity to make them suitable for clinical diagnosis.

Thus, there is a need for a system and method for automatically classifying ciliary motion as normal or abnormal in order to effectively and efficiently diagnose CM defects and thereby identify patients at risk for sinopulmonary disease.

SUMMARY OF THE INVENTION

In one embodiment, a method of classifying ciliary motion is provided that includes receiving digital video data representing the ciliary motion generated by an image capture device, wherein the digital video data includes a plurality of frames. The method further includes receiving an indication of a region of interest applicable to each of the frames, wherein the region of interest includes a plurality of pixels in each of the frames, calculating time series elemental motion data for at least one elemental motion parameter for the region of interest based on the digital video data, and using the time series elemental motion data to classify the ciliary motion.

In another embodiment, an apparatus for classifying ciliary motion is provided. The apparatus includes an image capture device for generating digital video data representing the ciliary motion, wherein the digital video data includes a plurality of frames, and a processor apparatus that stores and is structured to execute a number of routines for implementing the method described above.

DESCRIPTION OF EXEMPLARY EMBODIMENTS

As used herein, the singular form of "a", "an", and "the" include plural references unless the context clearly dictates otherwise. As used herein, the statement that two or more parts or components are "coupled" shall mean that the parts are joined or operate together either directly or indirectly, i.e., through one or more intermediate parts or components, so long as a link occurs.

As used herein, "directly coupled" means that two elements are directly in contact with each other.

As used herein, "fixedly coupled" or "fixed" means that two components are coupled so as to move as one while maintaining a constant orientation relative to each other.

As used herein, the word "unitary" means a component is created as a single piece or unit. That is, a component that includes pieces that are created separately and then coupled together as a unit is not a "unitary" component or body.

As employed herein, the statement that two or more parts or components "engage" one another shall mean that the parts exert a force against one another either directly or through one or more intermediate parts or components.

As employed herein, the term "number" shall mean one or an integer greater than one (i.e., a plurality).

As used herein, the terms "component" and "system" are intended to refer to a computer related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within as process and/or thread of execution, and a component can be localized on one computer and/or distributed between two or more computers. While certain ways of displaying information to users are shown and described with respect to certain figures or graphs as screenshots, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

The present invention will now be described, for purposes of explanation, in connection with numerous specific details in order to provide a thorough understanding of the subject invention. It will be evident, however, that the present invention can be practiced without these specific details without departing, from the spirit and scope of this innovation.

The disclosed concept provides a computational pipeline that uses a high-speed digital video of live cells from biopsy samples and decomposes the CM into idealized elemental components that form a "digital signature," or quantitative description of CM. In connection with the disclosed concept, CM is considered an instance of dynamic texture (DT). DTs are characterized by rhythmic motions of particles subjected to stochastic noise. Examples of DTs include familiar motion patterns such as flickering flames, rippling water, or grass in the wind. Likewise, cilia beat in rhythmic waves, with some stochastic behavior that collectively determines their CM. DT analysis has been shown to be an effective analysis method in other biomedical contexts, such as localizing cardiac tissue in 3D time-lapse heart renderings and to quantify thrombus formations in time-lapse microscopy. As described in greater detail herein, the disclosed concept implements two distinct classification strategies that yielded robust results on two independent patient datasets of differing quality, recapitulating expert beat pattern analysis and demonstrating the efficacy of elemental components for classifying CM. The computational pipeline of the disclosed concept can be used as a "black box" tool without specialized knowledge in machine learning or computer vision, rendering CM predictions in an objective and quantitative fashion and eliminating reviewer subjectivity.

The various particular embodiments of the disclosed concept are described in detail herein. An exemplary diagnostic system 2 in which the disclosed concept may be implemented (e.g., at least in part as one or more software routines) is described below with reference to FIGS. 1 and 2.

Figure 1:
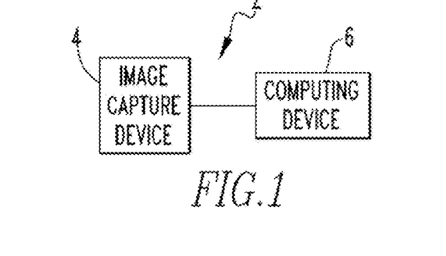
FIG. 1 is a block diagram of an exemplary diagnostic system in which the disclosed concept may be implemented.

As seen in FIG. 1, diagnostic system 2 includes an image capture device 4 that is structured to be able to capture high speed (e.g., 200 fps) digital video images (e.g., in AVI format) of nasal ciliary biopsies, such as nasal brush biopsies. For example, and without limitation, image capture device 4 may be a digital video camera. Diagnostic system 2 further includes a computing device 6. Computing device 6 is structured to receive digital video image data from image capture device 4 by, for example, a wired or wireless connection. Computing device 6 may be, for example and without limitation, a PC, a laptop computer, a tablet computer, a smartphone, or any other suitable device structured to perform the functionality described herein. Computing device 6 is structured and configured to receive the image data from image capture device 4 and process the data using an embodiment of a method described in detail herein to classify ciliary motion as normal or abnormal in order to effectively and efficiently diagnose CM defects.

Figure 2:
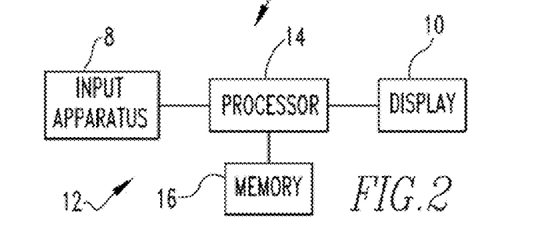
FIG. 2 is a block diagram of a computing device forming part of the diagnostic system of FIG. 1 according to an exemplary embodiment.

FIG. 2 is a block diagram of computing device 6 according to one exemplary embodiment. As seen in FIG. 2, the exemplary computing device 6 is a PC and includes an input apparatus 8 (which in the illustrated embodiment is a keyboard), a display 10 (which in the illustrated embodiment is an LCD), and a processor apparatus 12. A user is able to provide input into processor apparatus 12 using input apparatus 8, and processor apparatus 12 provides output signals to display 10 to enable display 10 to display information to the user as described in detail herein. Processor apparatus 12 comprises a processor 14 and a memory 16. Processor 14 may be, for example and without limitation, a microprocessor ($\mu P$), a microcontroller, or some other suitable processing device, that interfaces with memory 16. Memory 16 can be any one or more of a variety of types of internal and/or external, storage media such as, without limitation. RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. Memory 16 has stored therein a number of routines that are executable by processor 14. One or more of the routines implement (by way of computer/processor executable instructions) at least one embodiment of the method discussed briefly above and in greater detail below that is configured to aid in properly identifying CM defects by automatically classifying ciliary motion as represented by captured digital video image data.

Having Just described one exemplary diagnostic system in which the various embodiments of the disclosed concept may be implemented, the discussion will now turn to a detailed description of the methodologies of the disclosed concept. As noted above, the disclosed concept implements two distinct classification strategies for automatically classifying ciliary motion.

As noted elsewhere herein, current CM analysis techniques are highly subjective and lack quantitative standardization. The gold standard for PCD diagnosis relies on a combination of electron microscopy of cilia ultrastructure, nasal nitric oxide measurements, and videomicroscopy of nasal brush biopsies to determine CBF and manual ciliary beat pattern assessment. Each of these diagnostic steps has limitations. PCD may present without any visible ultrastructural defects, and CBF analysis examines only the dominant frequency from a kymograph of pixel intensity variations over time without consideration of other frequencies that may indicate abnormal motion. Furthermore, beat pattern annotation is highly subjective, error-prone, and operator dependent.

The disclosed concept addresses these issues in a computational framework for automated, Objective assessment of cilia motility that can be used reliably for clinical diagnosis of abnormal CM. The disclosed concept derives quantitative bases for comparison by decomposing the CM into constituent motions. For this analysis, high-speed digital videos obtained from patient nasal brush biopsies are examined and one or more regions of interest (ROIs) are selected for analysis.

As noted above, in the framework of the disclosed concept, CM is considered an instance of DT. DT analysis is well described in the fields of computer vision and machine learning and relies on tracking optical flow to quantify the direction and magnitude of motion at each pixel between two successive flames. Cilia beat in rhythmic waves with some stochastic behavior that collectively determine their CM. With DT analysis, CM is estimated using spatial and temporal changes in image intensities, quantified by the optical flow without the explicit delineation or tracking of the cilium.

The features used in DT analysis are functions of the first-order spatial derivatives of optical flow. From these derivatives, the disclosed concept computes the constituent, or elemental, motions used to characterize CM. These elemental motions are computed at each pixel and, in the exemplary embodiment, take the form of instantaneous rotation (or bending angle) and deformation (biaxial shear). These quantities are orientation-invariant; consequently, the CM analysis can be conducted regardless of the orientation of the cilia. Additionally, like pixel intensities, they also exhibit periodic temporal behavior that can be analyzed in much the same way.

A potential pitfall of automated CM analysis is the heterogeneity inherent in the CM. A single nasal brush biopsy often contains a spectrum of beat frequencies and motile behaviors, even within the same ROI. The heterogeneity can arise from multiple sources, such as overlapping cells with distinct motions, background particulate obstructing proper view of the cilia, and video capture artifacts such as changes in lighting or plane of focus.

Figure 3A:
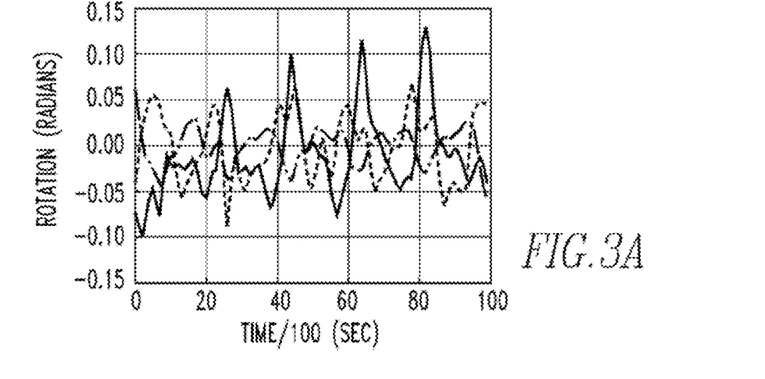
FIGS. 3A and 3B are graphs showing rotation and deformation data for exemplary ciliary motion.
Figure 3B:
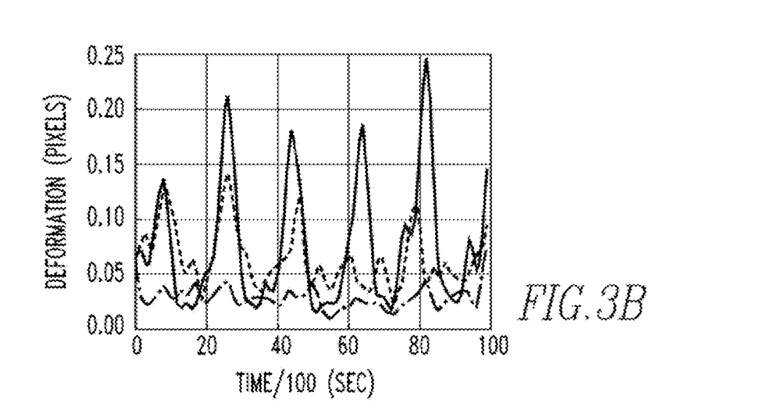
Figure 4A:
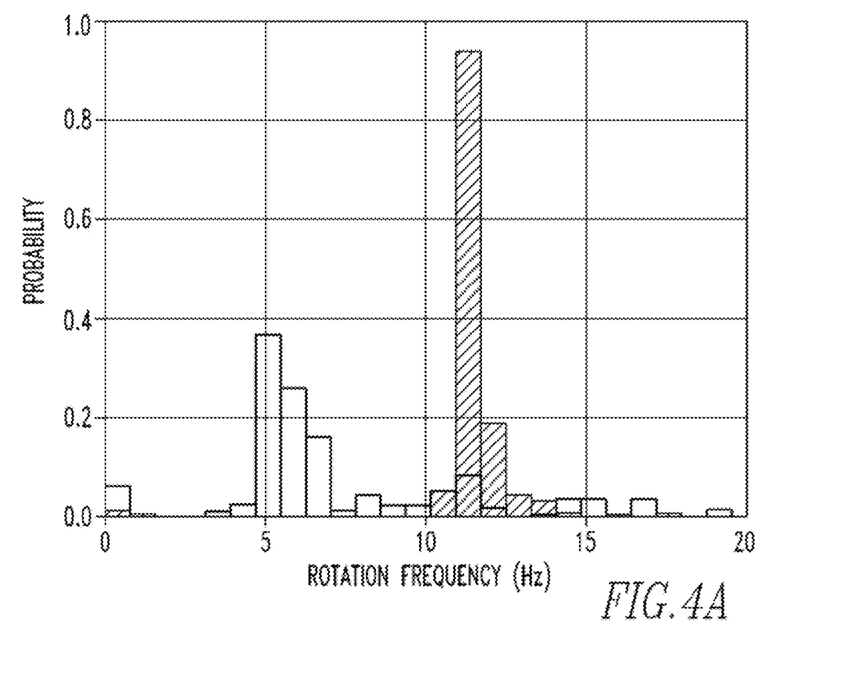
FIGS. 4A, 4B, 4C and 4D are histograms generated according to an aspect of the disclosed concept.
Figure 4B:
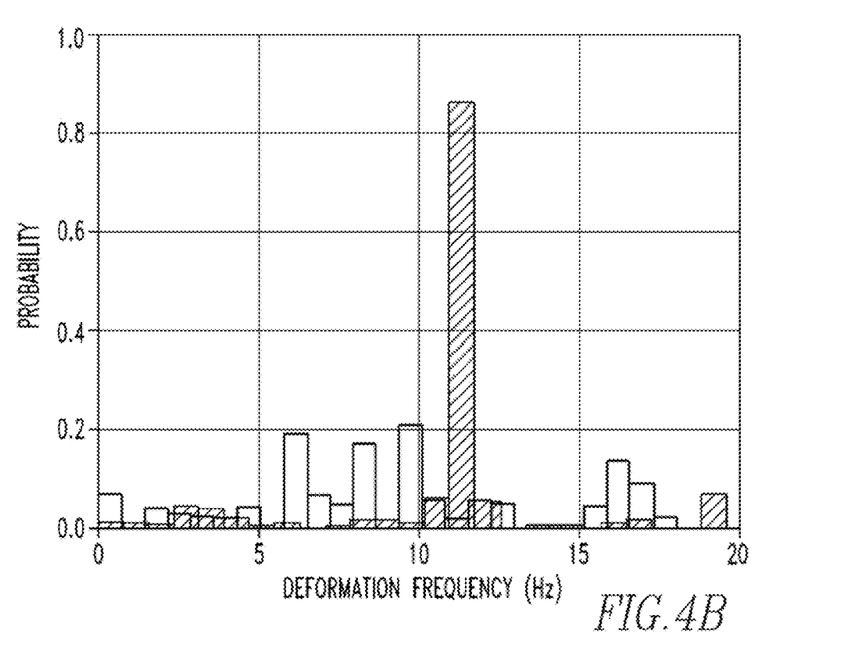
Figure 4C:
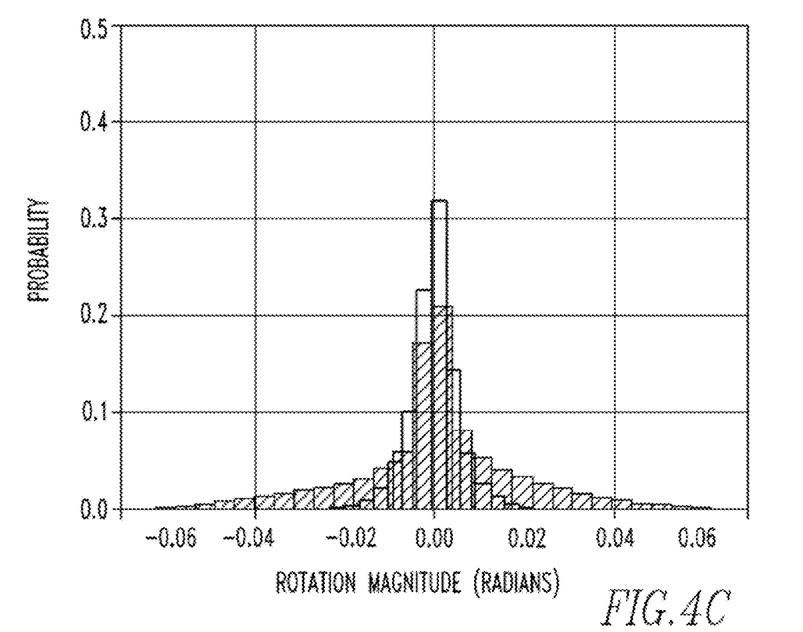
Figure 4D:
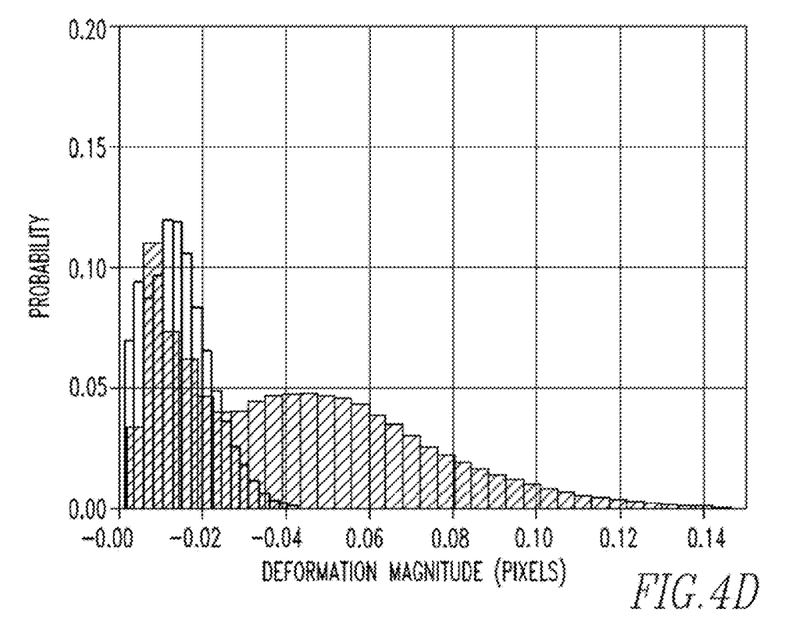

The disclosed concept provides two computational methods to quantify the CM and address its heterogeneity. In the first method, the disclosed concept uses aggregated temporal and frequency domain properties of the elemental motion signatures shown in FIGS. 3A and 3B (wherein the pixel represented by the solid line is indicative of healthy CM and the pixels represented by the dotted lines are representative of abnormal CM) in the form of histograms to build a robust representation of the CM and its variations, creating discriminative models of the CM. In the second method, the disclosed concept models the elemental motion signatures of CM and its variations directly using autoregressive (AR) processes, creating generative models of the CM.

Referring specifically to the first method, it represents the elemental motions of CM in each ROI as a combination of histograms, or profiles. This is a discriminative method, as the histograms are compact and discriminate abnormal from normal CM. In the exemplary embodiment, the disclosed concept computes the following four histograms, two in the temporal domain and two in the frequency domain: (i) a rotation frequency histogram/profile (RFP, FIG. (4A), (ii) a deformation frequency histogram/profile (DFP, FIG. 4B), (iii) a rotation magnitude histogram/profile (RMP, FIG. 4C), and (iv) a deformation magnitude profile (DMP, FIG. 4D). The magnitude histograms/profiles consist of the rotation and damnation time-series values in the ROI. The frequency histograms/profiles are built by transforming the rotation and deformation signals from the time domain into the frequency domain. Frequency profile calculation is analogous to computing CBF from pixel intensity variations, but rather than reporting a single dominant frequency for the entire ROI, a histogram is built from the dominant frequencies at each pixel. The combination of time-dependent and frequency-dependent properties allows the disclosed concept to differentiate CM that beat at similar rates but demonstrate different beat patterns, and vice versa. FIGS. 4A-4D show profiles for normal CM from one ROI (non-hatched) compared to abnormal CM in a second ROI (hatched) their qualitative differences suggest a quantitative basis for discriminating normal from abnormal CM.

Figure 5A:
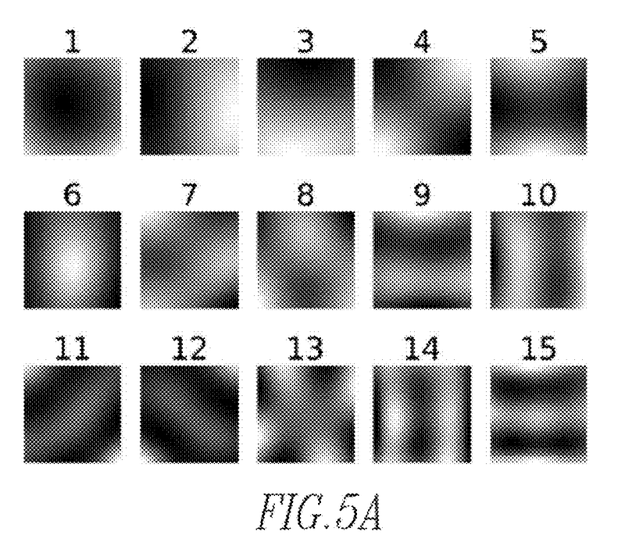
FIG. 5A shows PCA basis vectors from rotation ROIs according to an aspect of the disclosed concept
Figure 5B:
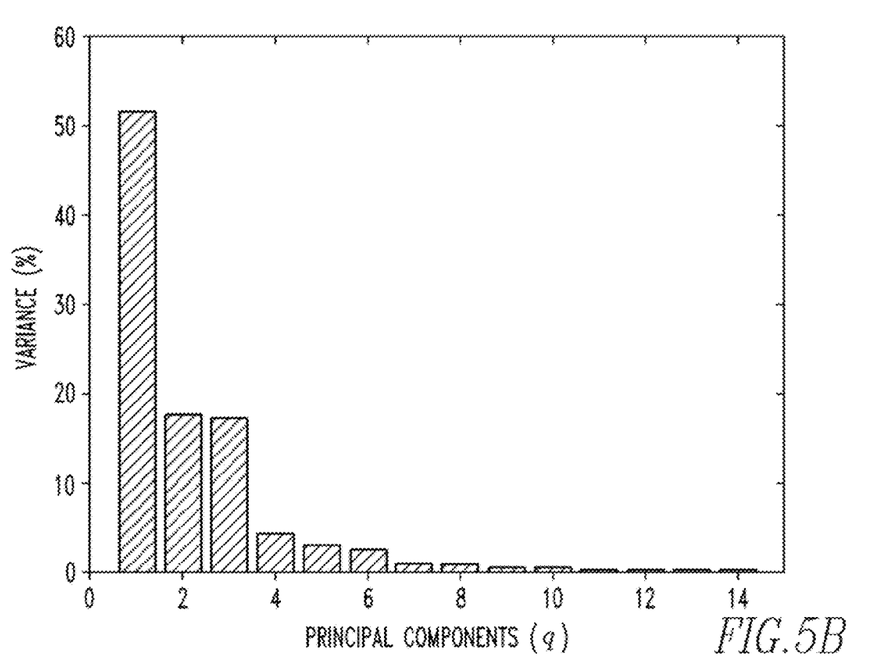
FIG. 5B is a histogram showing the variance in the appearance of the rotation FIG. 5A.
Figure 5C:
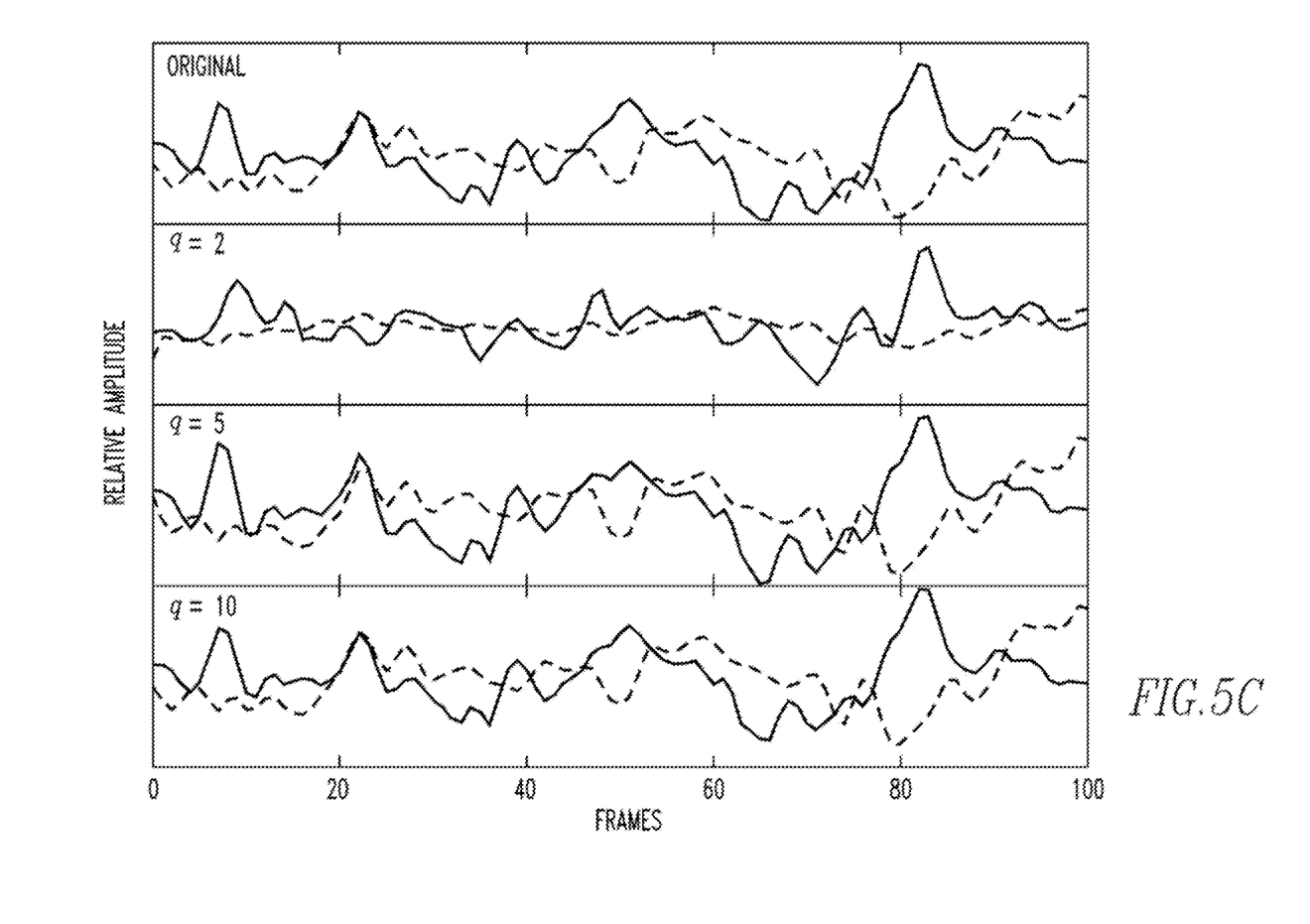
FIG. 5C reconstruction of an original signal with a small number of PCA basis vectors according to an aspect of the disclosed concept.

Referring now specifically to the second method, it models the elemental motions of CM directly using AR models. This is a generative method the representation is not as compact, but can be used to generate new instances of CM that adhere to certain statistical properties. AR models are useful for representing periodic signals, such as DTs. AR models have an appearance component (the distribution of values at any time t) and a dynamic component (how the values change from t to t+1). The appearance component is derived by principal component analysis (PCA) of elemental motions in arbitrary patches of fixed size extracted from ROIs. FIG. 5A shows PCA basis vectors for patches from rotation ROIs; as shown in FIG. 5B, a large amount of variance in the appearance of this rotation is captured by small number of PCA dimensions. The evolution of elemental motions in a patch can be viewed as a time-series in the PCA space by projection (FIG. 5C, top panel) and can be captured by a small number of PCA dimensions (FIG. 5C, middle and bottom panels). This evolution is quantified by a set of motion parameters that define how the cilia move within the PCA space, providing a generative basis for CM identification.

Figure 6:
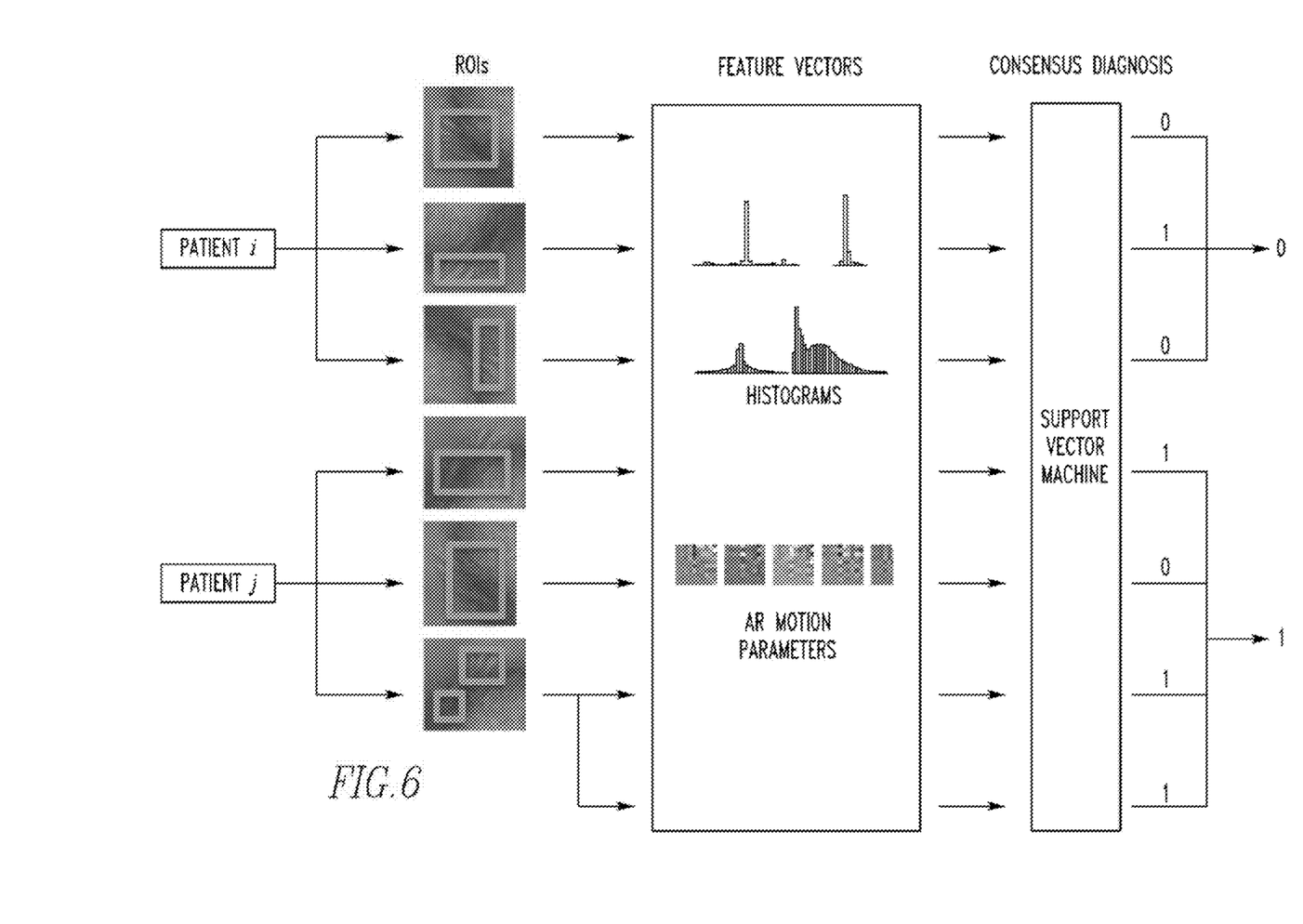
FIG. 6 is a schematic flow diagram illustrating the methodology of classifying ciliary motion according to an exemplary embodiment of the disclosed concept.

FIG. 6 schematically shows (as an overview) the implementation of the methodology of the disclosed concept is applied to 2 different patients (patient I and patient J) according to one particular exemplary embodiment. This implementation is described below.

First, high-speed digital videos of ciliary biopsies from the 2 patients is uploaded in an appropriate format, such as, without limitation, AVI format at 200 fps, to an electronic repository such as a website built using the open source jQuery-File-Upload application (https://github.com/blueimp/jQuery-File-Upload) on an Apache 2.2 webserver running PHP 5. After upload, the users are presented with an interface, such as in HTML5 canvas interface, through which they are able to specify regions of interest (ROIs) by drawing boxes over a still frame of the video. This process is referred to as video annotation, and each annotation is stored in a suitable database such as a MySQL database.

Next, the ROIs are processed through a priming method designed to discard noisy or background pixels; for example, pixels depicting cells or space beyond the cilia. This pruning method identified a threshold and discarded pixels whose intensity changes fell below it. In the exemplary embodiment, the threshold value is adaptive and specific to each ROI, as the intensities between ROIs may vary greatly. In particular, in the exemplary embodiment, for a single ROI, the standard deviation $\sigma_i$ of the time-varying intensity changes at each pixel i is computed and used to construct a histogram of these standard deviations. The Kolmogorov-Smirnov distance metric is used to determine whether the histogram more closely resembled a gamma distribution or a Gaussian distribution. In the former case, the distribution's peak, or $\sigma_{peak}$, is used as the pruning threshold value, and all pixels for which $\sigma_i < \sigma_{peak}$ are discarded. If the distribution is better approximated by a Gaussian, the distribution's mean, or $\sigma_{mean}$, is used as the pruning value, and all pixels for which $\sigma_i < \sigma_{mean}$ our discarded. Furthermore, a connected component analysis is performed on the remaining pixels and all but those in the largest component are discarded. The analysis described below is then performed only on these remaining pixels.

First, X and Y (horizontal and vertical) optical flow components are computed for each ROI. The derivatives of these vectors are then computed and used to calculate the rotation (in radians/frame, FIG. 3A) and deformation (in pixels/frame, FIG. 3B) at each pixel. Deformation, like optical flow, is a vector quantity, and therefore any analysis performed uses its vector magnitude.

Next, as noted elsewhere herein, two classification methods that operate in distinct feature spaces are then employed to analyze and further process the optical flow components.

As described briefly elsewhere herein, the first method uses a combination of histograms, or profiles, composed of rotation and deformation time-series data (magnitude profiles), and the frequencies with which those time-series changed (frequency profiles). In the exemplary embodiment, magnitude profiles are computed by first filtering the rotation and deformation time-series data with a one-dimensional Gaussian with width σ. The filtered data is then placed in histograms, forming the RMP (FIG. 4C) and DMP (FIG. 4D) for an ROI. Frequency profiles are then computed by transforming the time-series data into the frequency domain using a Fast Fourier Transform. Specifically, in the exemplary embodiment, a spectrogram, or a sliding average of frequency spectra, is computed which results in a robust Fourier representation of the original signal. The subsequent signal amplitude defined the power spectrum for the rotation or deformation at a pixel. From this power spectrum, the dominant frequency is identified. A heatmap of these frequencies is created by arranging them spatially according to pixel position. Spurious frequencies are suppressed using a median filter. The resulting frequencies, one at each pixel, are then collected into histograms with κ bins, forming the RFP (FIG. 4A) and DFP (FIG. 4B) for an ROI.

As also described briefly elsewhere herein, the second method models the CM as an autoregressive (AR) process. AR models consist of an appearance component defining how the cilia look, and a dynamic component defining how the cilia move in a principal component space of q dimensions. In the exemplary embodiment Singular Value Decomposition (SVD) is used to compute the principal component analysis (PCA) space and derive the basis vectors. PCA is sensitive to the spatial orientation of the system, precluding the use of pixel intensities in AR analysis: if the cilia are not identically oriented, the resulting PCA basis vectors for intensities will resemble random noise. This underscores one of the main advantages of using orientation-invariant properties of the CM such as rotation and deformation. Next, in the exemplary embodiment a pixel nearest the middle of a ROI with a signal at the dominant frequency for the ROI is located, and a 15×15 box is expanded around that pixel, forming a patch. After extraction, each frame is flattened into a single 225-length column vector, giving each patch dimensions of 225×250 frames. This process is repeated for all ROIs, appending each patch to the end of the previous one. This will result in a data structure with dimensions 225×(in* 250), wherein in is the number of our allies in the data set. SVD is then performed on this structure to yield the basis vectors (FIG. 5A) and AR motion parameters. The parameters comprised d transition matrices, each with dimensions q *q, and defined the CM within the PCA space.

In the exemplary embodiment, for classification and testing purposes, each ROI is treated as a single data instance with its corresponding label (0 for healthy, 1 for abnormal). a Support Vector Machine (SVM), a popular classification method in machine learning, is then used to test the methods. All classifiers operate on the premise of finding a rule, or decision boundary, which most accurately separates data instances into their correct categories. These boundaries often take the form of lines, or planes, which separate instances in Cartesian space. Functionally, each ROI can be considered a point in high-dimensional space; thus, an SVM will attempt to find a plane in that space which most accurately separates the healthy instances from the dyskinetic ones.

In the exemplary embodiment, the SVM is implemented using the Python scikit-learn machine learning library, which uses the popular libsvm implementation for SVMs. Generally, a data instance consists of a single array, or "feature vector," that quantitatively describes the instance. different feature vectors are used for the two methods of the disclosed concept.

For the histogram/profile method, the RFP, RMP, DFP, and DMP computed from an ROI are combined into a custom SVM kernel. Four weights that sum to 1, one for each histogram, are then chosen through multiple parameter scans. Each histogram is compared pairwise to the matching histogram of all other instances. In the exemplary embodiment, the $X^2$ metric is used for comparison, as it is commonly used for comparing histograms. The four $X^2$ distances, weighted accordingly, are summed into a final "similarity" score between two ROI instances. This process is repeated for all pairwise combinations of ROIs, generating at N×N kernel matrix that is used to initialize the SVM. Specifically, in the exemplary embodiment, an instance of NuSVC in the scikit-learn library is used.

For the AR method, the transition matrices of the dynamic component for each ROI are used as feature vectors in the SVM. The dimensionality of the associated transition matrices is controlled through the parameter q, while the number of transition matrices is governed by the parameter d. The transition matrices are flattened row-wise and concatenated, resulting in a single feature vector for each ROI with length q * q * d. As before, in the exemplary embodiment, an instance of NuSVC is used to perform classification.

In order to return a patient-level diagnostic prediction, a majority vote is performed using the ROI classifications for each patient, with the result of that vote being returned as the overall diagnostic prediction for the patient.

Thus, as described herein, the disclosed concept provides a robust and objective video image based system and method for automatically classifying ciliary motion as normal or abnormal in order to effectively and efficiently diagnose CM defects.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method of classifying ciliary motion, comprising:
   receiving digital video data representing the ciliary motion generated by an image capture device, the digital video data comprising a plurality of frames;
   receiving an indication of a region of interest applicable to each of the frames, the region of interest comprising a plurality of pixels in each of the frames;
   calculating time series elemental motion data for at least one elemental motion parameter for the region of interest based on the digital video data; and
   using the time series elemental motion data to classify the ciliary motion.

2. The method according to claim 1, wherein the calculating the time series elemental motion comprises creating optical flow vector data for the region of interest using the digital video data and calculating the time series elemental motion data for the at least one elemental motion parameter based on the optical flow vector data.

3. The method according to claim 2, wherein the using the time series elemental motion data comprises creating at least one temporal domain histogram and at least one frequency domain histogram using the times series elemental motion data, and using the at least one temporal domain histogram and the at least one frequency domain histogram to classify the ciliary motion.

4. The method according to claim 2, wherein the calculating the time series elemental motion data for at least one elemental motion parameter based on the optical flow vector data comprises calculating time series rotation data and time series deformation data based on the optical flow vector data.

5. The method according to claim 4, wherein the using step comprises creating a rotation temporal domain histogram and a rotation frequency domain histogram using the time series rotation data and a deformation temporal domain histogram and a deformation frequency domain histogram using the time series deformation data, and using the rotation temporal domain histogram, the rotation frequency domain histogram, the deformation temporal domain histogram, the deformation frequency domain histogram to classify the ciliary motion.

6. The method according to claim 1, wherein the using the time series elemental motion data to classify the ciliary motion comprises calculating a plurality of autoregressive motion parameters using the time series elemental motion data and using the autoregressive motion parameters to classify the ciliary motion.

7. The method according to claim 6, wherein the calculating the plurality of autoregressive motion parameters comprises performing singular value decomposition using the time series elemental motion data to generate a plurality of basis vectors, and generating the autoregressive motion parameters using the basis vectors.

8. The method according to claim 1, wherein the using the time series elemental motion data to classify the ciliary motion comprises creating at least one temporal domain histogram and at least one frequency domain histogram using the time series elemental motion data, calculating a plurality of autoregressive motion parameters using the time series elemental motion data, and using the at least one temporal domain histogram, the at least one frequency domain histogram and the autoregressive motion parameters to classify the ciliary motion.

9. The method according to claim 1, wherein the ciliary motion is classified as normal or abnormal in the using step.

10. The Method according to claim 1, further comprising generating and displaying an output based on a result of the using step.

11. The method according to claim 1, further comprising identifying a second region of interest applicable to each of the frames, the second region of interest comprising a second plurality of pixels in each of the frames, and calculating second times elemental motion data for at least one elemental motion parameter for the second region of interest based on the digital video data, wherein the using step comprises using the elemental motion data and the second elemental motion to classify the ciliary motion.

12. A non-transitory computer readable medium storing one or more programs, including instructions, which when executed by a computer, causes the computer to perform the method of claim 1.

13. An apparatus for classifying ciliary motion, comprising:
   an image capture device for generating digital video data representing the ciliary motion, the digital video data comprising a plurality of frames;
   a processor apparatus that stores and is structured to execute a number of routines, the number of routines being structured to:
   receive the digital video data;
   receive an indication of a region of interest applicable to each of the frames, the region of interest comprising, a plurality of pixels in each of the frames;
   calculate time series elemental motion data for at least one elemental motion parameter for the region of interest based on the digital video data; and
   use the time series elemental motion data to classify the ciliary motion.

14. The apparatus according to claim 13, wherein the routines are structured to calculate the time series elemental motion by creating optical flow vector data for the region of interest using the digital video data and calculating the time series elemental motion data for the at least one elemental motion parameter based on the optical flow vector data.

15. The apparatus according to claim 14, wherein the routines are structured to use the time series elemental motion data by creating at least one temporal domain histogram and at least one frequency domain histogram using the times series elemental motion data, and using the at least one temporal domain histogram and the at least one frequency domain histogram to classify the ciliary motion.

16. The apparatus according to claim 14, wherein the routines are structured to calculate the time series elemental motion data for at least one elemental motion parameter based on the optical flow vector data comprises calculating time series rotation data and time series deformation data based on the optical flow vector data.

17. The apparatus according to claim 16, wherein the routines are structured to use the time series elemental motion data by creating a rotation temporal domain histogram and a rotation frequency domain histogram using the time series rotation data and a deformation temporal domain histogram and a deformation frequency domain histogram using the time series deformation data, and using the rotation temporal domain histogram, the rotation frequency domain histogram, the deformation temporal domain histogram, the deformation frequency domain histogram to classify the ciliary motion.

18. The apparatus according to claim 13, wherein the routines are structured to use the time series elemental motion data to classify the ciliary motion by calculating a plurality of autoregressive motion parameters using the time series elemental motion data and using the autoregressive motion parameters to classify the ciliary motion.

19. The apparatus according, to claim 18, wherein the routines are structured to calculate the plurality of autoregressive motion parameters by performing singular value decomposition using the time series elemental motion data to generate a plurality of basis vectors, and generating the autoregressive motion parameters using the basis vectors.

20. The apparatus according to claim 13, wherein the routines are structured to use the time series elemental motion data to classify the ciliary motion by creating at least one temporal domain histogram and at least one frequency domain histogram using the time series elemental motion data, calculating a plurality of autoregressive motion parameters using the time series elemental motion data, and using the at least one temporal domain histogram, the at least one frequency domain histogram and the autoregressive motion parameters to classify the ciliary motion.

* * * * *